United States Patent
Suwa et al.

(10) Patent No.: US 10,190,025 B2
(45) Date of Patent: Jan. 29, 2019

(54) ADHESIVE COMPOSITION FOR POLARIZING PLATE

(71) Applicant: SAMSUNG SDI CO., LTD., Yongin-si, Gyeonggi-do (KR)

(72) Inventors: Tatsuhiro Suwa, Yokohamashi (JP); Hiroshi Ogawa, Yokohamashi (JP)

(73) Assignee: Samsung SDI Co., Ltd., Yongin-si (KR)

( * ) Notice: Subject to any disclaimer, the term of this patent is extended or adjusted under 35 U.S.C. 154(b) by 182 days.

(21) Appl. No.: 15/037,620

(22) PCT Filed: Nov. 17, 2014

(86) PCT No.: PCT/KR2014/011030
§ 371 (c)(1),
(2) Date: May 18, 2016

(87) PCT Pub. No.: WO2015/072800
PCT Pub. Date: May 21, 2015

(65) Prior Publication Data
US 2016/0280964 A1   Sep. 29, 2016

(30) Foreign Application Priority Data

Nov. 18, 2013 (JP) .................... 2013-238117
Nov. 5, 2014 (KR) ................. 10-2014-0153133

(51) Int. Cl.
*C09J 4/00* (2006.01)
*C08F 2/50* (2006.01)
(Continued)

(52) U.S. Cl.
CPC .................. *C09J 4/00* (2013.01); *C08F 2/50* (2013.01); *C08F 220/18* (2013.01);
(Continued)

(58) Field of Classification Search
CPC ........................................................ C09J 4/00
See application file for complete search history.

(56) References Cited

U.S. PATENT DOCUMENTS

2009/0131608 A1   5/2009   Liu et al.
2009/0215964 A1   8/2009   Chabut et al.
(Continued)

FOREIGN PATENT DOCUMENTS

CN   1871299 A   11/2006
CN   101301805 A   11/2008
(Continued)

OTHER PUBLICATIONS

JPO Office Action for corresponding Japanese Patent Application No. 2013-238117, dated Apr. 11, 2017 (5 sheets).
International Search Report of corresponding PCT/KR2014/011030, dated Feb. 24, 2015, 6 pages.
China Office Action dated Mar. 29, 2018 in corresponding Chinese Patent Application No. 201480071189.1 (7 pgs.).

*Primary Examiner* — Megan McCulley
(74) *Attorney, Agent, or Firm* — Lewis Roca Rothgerber Christie LLP (57) ABSTRACT

An adhesive composition for a polarizing plate of the present invention comprises, on the basis of 100 parts by weight of a polymerizable component: the polymerizable component comprising (A) approximately 50-90 parts by weight of an epoxy group-containing compound and (B) approximately 10-50 parts by weight of a (meth)acrylate monomer; (C) approximately 1-7 parts by weight of a photoacid generator; and (D) approximately 0.1-7 parts by weight of at least one between a photosensitizer and a photopolymerization initiator, wherein the epoxy group-containing compound (A) comprises: (A1) approximately 50-95 parts by weight of an alicyclic epoxy group-containing compound; and (A2) 1 to approximately 50 parts by weight of an aromatic group-containing epoxy group-containing compound, on the basis of 100 parts by weight of the epoxy group-containing compound (A), and the mass ratio (Continued)

of the alicyclic epoxy group-containing compound (A1) to the aromatic group-containing epoxy group-containing compound (A2) can be approximately 3:1 to approximately 95:1. Accordingly, embodiments of the present invention can provide: an adhesive composition for a polarizing plate, having all the properties of sufficient initial curing, adhesion and reliance; and a polarizing plate and an optical display device comprising the same.

12 Claims, 4 Drawing Sheets

(51) Int. Cl.
*G02B 5/30* (2006.01)
*G02B 1/14* (2015.01)
*C08F 220/18* (2006.01)
*C08F 222/10* (2006.01)

(52) U.S. Cl.
CPC .............. *C08F 222/10* (2013.01); *G02B 1/14* (2015.01); *G02B 5/305* (2013.01)

(56) References Cited

U.S. PATENT DOCUMENTS

| | | |
|---|---|---|
| 2010/0327493 A1 | 12/2010 | Fong et al. |
| 2015/0099127 A1 | 4/2015 | Ogawa et al. |

FOREIGN PATENT DOCUMENTS

| | | |
|---|---|---|
| CN | 103314317 A | 9/2013 |
| JP | 11-199681 | 7/1999 |
| JP | 2002-235066 A | 8/2002 |
| JP | 2008-257199 | 10/2008 |
| JP | 2008-287207 | 11/2008 |
| JP | 2010-523801 A | 7/2010 |
| JP | 2012-062471 A | 3/2012 |
| JP | 2012-172026 | 9/2012 |
| JP | 2013-043952 A | 3/2013 |
| JP | 2013-185133 A | 9/2013 |
| KR | 10-2008-0099154 | 11/2008 |
| KR | 10-2013-0020618 | 2/2013 |
| KR | 10-2013-0040725 | 4/2013 |
| WO | WO 2013/027981 A2 | 2/2013 |
| WO | WO 2013/055154 A2 | 4/2013 |

ADHESIVE COMPOSITION FOR POLARIZING PLATE

CROSS-REFERENCE TO RELATED APPLICATIONS

This application is a National Phase Patent Application of International Patent Application Number PCT/KR2014/011030, filed on Nov. 17, 2014, which claims priority to and the benefit of Japanese Patent Application Number 2013-238117, filed Nov. 18, 2013, and Korean Patent Application Number 10-2014-0153133, filed Nov. 5, 2014, the entire disclosures of which are hereby incorporated by reference.

TECHNICAL FIELD

The present invention relates to an adhesive composition that may be used to prepare a polarizing plate by attaching a polarizer to a protective film, and a polarizing plate using the same.

BACKGROUND ART

In recent years, flat panel displays such as liquid crystal displays or plasma displays have been broadly used as image display devices in view of saving a space and realizing a high definition. Among these, liquid crystal displays have attracted attention due to a higher power saving ability and a high definition, and have been devoted to developing such liquid crystal displays.

To exhibits a function of liquid crystal display panels, polarizing plates serving as an optical shutter have been used along with liquid crystals in liquid crystal display panels. The polarizing plates which include a polarizer are an essential component for liquid crystal display panels. In general, the polarizers are prepared by uniaxial stretching of a polyvinyl alcohol (PVA) resin in a water bath with a stretch ratio of 5 times to 6 times, for that, it tend to be easily torn along the stretching direction and are fragile. For this reason, the polarizers have protective films formed on its one or/and both surfaces, and comprise the polarizing plates. In this case, an adhesive used to bond the protective film to the polarizers needs to satisfy specific properties to be required for the polarizing plates as well.

Conventionally, a water-based adhesive such as PVA, and the like has been used as an adhesive for preparing polarizing plates. However, the water-based adhesive has the problems of an improper in improvement of productivities and also exhibits a poor adhesive strength to the protective film made of cycloolefin polymer, and the like. To solve these problems, recently, an ultraviolet curable adhesive are used instead of the water-based adhesive for preparing the polarizing plates. As the ultraviolet curable adhesive, a cationic-curable adhesive comprised of a cationic polymerizable compound having an epoxy group, etc.; a radical-curable adhesive comprised of a radical polymerizable compound having a (meth)acryloyl group, etc.; and a so-called hybrid adhesive comprised of both the cationic polymerizable compound and the radical polymerizable compound; are used.

As an ultraviolet curable adhesive, for example, patent document 1 is about a cationic-curable adhesive comprising primarily (A) 100 parts by weight of an epoxy resin having two or more epoxy groups in a molecule, of which at least one is an alicyclic epoxy group, (B) 5 parts by weight to 1000 parts by weight of an epoxy resin having two or more epoxy groups in a molecule and substantially not having an alicyclic epoxy group and (C) 0.5 parts by weight to 20 parts by weight of a cationic photopolymerizable initiator. However, the cationic-curable adhesive disclosed in Japanese Patent Laid-Open Publication No. 2008-257199 A generally has the problems of leading to a reduction in productivity of the polarizing plates due to a reduced initial curability even though a high adhesion.

Patent document 2, discloses a radical-curable adhesive comprising a compound having a (meth)acryloyl group such as N-hydroxyethylacrylamide and N-acryloylmorpholine, and the like as a curable component. However, the radical-curable adhesive disclosed in Japanese Patent Laid-Open Publication No. 2008-287207 A generally has the problems of leading to a reduction in adhesion even though a high reactivity.

In addition, patent document 3 discloses a hybrid adhesive comprising primarily (A) 100 parts by weight of an active energy ray-curable compound comprising (A1) 5 wt % to 100 wt % of an active energy ray- and cationic-curable compound having an epoxy group or an oxetanyl group and not having an active energy ray and radical polymerizable functional group, with an weight average molecule weight of less than 5,000 and (A2) 0 wt % to 95 wt % of an active energy ray- and radical-curable compound and (B) 0.0001 part by weight to 2 parts by weight of an acryl resin having an epoxy group or an oxetanyl group with an weight average molecule weight of 5,000 to 150,000. However, the hybrid adhesive disclosed in Japanese Patent Laid-Open Publication No. 2012-172026 A generally has the problems of leading to a reduction in reliability such as an occurrence of cracks of the polarizers in a thermal shock test and also an insufficient adhesion.

PRIOR ARTS (patent document 1) JP2008-257199 A
(patent document 2) JP2008-287207 A
(patent document 3) JP2012-172026 A

DISCLOSURE

Technical Problem

It is an object of the present invention to provide an adhesive composition for polarizing plates exhibiting sufficient initial curing properties, adhesion and reliability.

Technical Solution

In one aspect, the present invention relates to an adhesive composition including a polymerizable component including an epoxy group-containing compound (A) and a (meth)acrylate monomer (B); a photoacid generator (C); and a photosensitizer and a photopolymerization initiator (D).

In one embodiment, the adhesive composition may include a polymerizable component including about 50 parts by weight to about 90 parts by weight of an epoxy group-containing compound (A) and about 10 parts by weight to about 50 parts by weight of a (meth)acrylate monomer (B), based on 100 parts by weight of the polymerizable component; about 1 part by weight to about 7 parts by weight of a photoacid generator (C); and about 0.1 parts by weight to about 7 parts by weight of at least one of a photosensitizer and a photopolymerization initiator (D); wherein the epoxy group-containing compound (A) may include about 50 parts by weight to about 95 parts by weight of an alicyclic epoxy group-containing compound (A1) and about 1 part by weight to about 50 parts by weight of an aromatic group- and epoxy group-containing compound (A2), based on 100 parts by weight of the epoxy group-containing compound (A), and the alicyclic epoxy group-containing compound (A1) and the aromatic group- and epoxy group-containing compound (A2) may have a weight ratio of about 3:1 to about 95:1.

In another embodiment, the epoxy group-containing compound (A) may further include more than about 0 part by weight and about 40 parts by weight or less of an alicyclic group- and epoxy group-containing and aromatic group-free compound (A3), based on 100 parts by weight of the epoxy group-containing compound (A).

In another embodiment, the (meth)acrylate monomer (B) may include more than about 0 part by weight and about 100 parts by weight or less of a polyfunctional (meth)acrylate monomer (B2), based on 100 parts by weight of the (meth) acrylate monomer (B).

In another embodiment, the epoxy group-containing compound (A) may include about 50 parts by weight to about 80 parts by weight of the alicyclic epoxy group-containing compound (A1), about 1 part by weight to about 27 parts by weight of the aromatic group- and epoxy group-containing compound (A2), and about 1 part by weight to about 40 parts by weight of the alicyclic group- and epoxy group-containing and aromatic group-free compound (A3), based on 100 parts by weight of the epoxy group-containing compound (A).

In one embodiment, the adhesive composition may include a polymerizable component including about 50 parts by weight to about 90 parts by weight of an epoxy group-containing compound (A) and about 10 parts by weight to about 50 parts by weight of a (meth)acrylate monomer (B), based on 100 parts by weight of the polymerizable component; about 1 part by weight to about 7 parts by weight of a photoacid generator (C); and about 0.1 parts by weight to about 7 parts by weight of at least one of a photosensitizer and a photopolymerization initiator (D); wherein the epoxy group-containing compound (A) may include about 60 parts by weight to about 95 parts by weight of an alicyclic epoxy group-containing compound (A1) and about 5 parts by weight to about 40 parts by weight of an aromatic group- and epoxy group-containing compound (A2), based on 100 parts by weight of the epoxy group-containing compound (A), and the (meth)acrylate monomer (B) may include more than about 0 part by weight and about 100 parts by weight or less of a polyfunctional (meth)acrylate monomer (B2), based on 100 parts by weight of the (meth)acrylate monomer (B).

When the polyfunctional (meth)acrylate monomer (B2) is used, the epoxy group-containing compound (A) may further include more than about 0 part by weight and about 40 parts by weight or less of an alicyclic group- and epoxy group-containing and aromatic group-free compound (A3), based on 100 parts by weight of the epoxy group-containing compound (A).

When the polyfunctional (meth)acrylate monomer (B2) is used, the alicyclic epoxy group-containing compound (A1) and the aromatic group- and epoxy group-containing compound (A2) in the epoxy group-containing compound (A) may have a weight ratio of about 3:1 to about 19:1.

In another aspect, the present invention relates to a polarizing plate including a polarizer and a protective film, wherein the polarizer and the protective film are bonded using the adhesive composition for polarizing plates according to any one of claims 1 to 7.

The protective film may be a PET film, and the polarizer and PET film may have a peel strength of about 3N/25 mm or more under conditions of a peel angle of 90° and a peel rate of 300 mm/min.

The protective film may be a COP film, and the polarizer and COP film may have a peel strength of about 2N/25 mm or more under conditions of a peel angle of 90° and a peel rate of 300 mm/min.

In still another aspect, the present invention relates to an image display device having the polarizing plate.

Advantageous Effects

The present invention provides an adhesive composition for polarizing plates exhibiting sufficient initial curability, adhesion and reliability.

BEST MODE

Hereinafter, although the embodiments of the present invention will be described, the present invention is not limited to the following embodiments and will be determined by the following claims. Also, since dimension ratios in the Figures are exaggerated for the convenience of descriptions, these may be different from actual ratios. As used herein, the term [X to Y] representing a range refers to [equal to or greater than X and equal to or less than Y]. Also, as used herein, the terms [weight] and [mass], [wt %] and mass %] and [parts by mass] and [parts by weight] are considered as synonyms unless otherwise specifically described. In addition, unless otherwise specifically described, an measurement of operations and physical properties and the like is performed under conditions of a room temperature (20° C. to 25° C.)/a relative humidity of 40% to 60%.

<Adhesive Composition for Polarizing Plates>

In one embodiment of the present invention, the adhesive composition includes 100 parts by weight of a polymerizable component including about 50 parts by weight to about 90 parts by weight of an epoxy group-containing compound (A) and about 10 parts by weight to about 50 parts by weight of a (meth)acrylate monomer (B) (based on 100 parts by weight of the total amount of the (A) component and the (B) component); about 1 part by weight to about 7 parts by weight of a photoacid generator (C); and about 0.1 parts by weight to about 7 parts by weight of at least one of a photosensitizer and a photopolymerization initiator (D). Furthermore, the epoxy group-containing compound (A) may include about 50 parts by weight to about 95 parts by weight of an alicyclic epoxy group-containing compound (A1) and about 1 part by weight to about 50 parts by weight of an aromatic group- and epoxy group-containing compound (A2), based on a total 100 parts by weight of the epoxy group-containing compound (A).

As used herein, the term [an adhesive composition for polarizing plates] may be also referred to as [an adhesive composition].

As described above, the conventional hybrid adhesive including a cationic polymerizable compound and a radical polymerizable compound was insufficient in reliability (for example, difficulties in occurrence of cracks in a thermal shock test) or adhesion. In the embodiments of the present invention, an adhesive composition for polarizing plates may include an epoxy group-containing compound as a cationic polymerizable compound and a (meth)acrylate monomer as a radical polymerizable compound, with an alicyclic epoxy group-containing compound (A1) and an aromatic group- and epoxy group-containing compound (A2) being used as the epoxy group-containing compound, thereby exhibiting excellent adhesion and reliability.

Hereinafter, components of the adhesive composition of the embodiments of the present invention will be described in detail.

Epoxy Group-containing Compound (A)

In one embodiment, an adhesive composition includes (A) an epoxy group-containing compound. The (A) epoxy group-containing compound includes essentially (A1) an alicyclic epoxy group-containing compound and (A2) an aromatic group- and epoxy group-containing compound.

In another embodiment, an adhesive composition may include essentially (A1) an alicyclic epoxy group-containing compound and (A2) an aromatic group- and epoxy group-containing compound, and further include (A3) an alicyclic group- and epoxy group-containing compound as the (A) epoxy group-containing compound.

Alicyclic Epoxy Group-containing Compound (A1)

An alicyclic epoxy group-containing compound (A1) refers to a compound having an alicyclic epoxy group in a molecule. The term an alicyclic epoxy group means a functional group having structure represented by the Formula 1, wherein two neighboring carbon atoms of an alicyclic (cycloalkyl) group taken together form an epoxy group:

[Formula 1]

The alicyclic epoxy group-containing compound (A1) may have at least one alicyclic epoxy group in a molecule, for example, two or more alicyclic epoxy groups in a molecule. By this, a cross-linked structure may be formed and an adhesive layer may have an increased modulus of elasticity after curing. As a result, a change in volume generated by the heat may become lower and thus an occurrence of an internal stress, namely a reduction in strength may be suppressed and cracks of the polarizers in a thermal shock test may be more still suppressed. In addition, the alicyclic group in the alicyclic epoxy group may be substituted by methyl group, ethyl group, and etc.

Specific examples of the alicyclic epoxy group-containing compound (A1) may include, for example, vinyl cyclohexene monooxide, vinyl cyclohexene dioxide, limonene dioxide, 1,2:8,9-diepoxy limonene, 3,4-epoxycyclohexylmethyl-3',4'-epoxycyclohexanecarboxylate, 3,4-epoxycyclohexenylmethyl-3,4'-epoxycyclohexenecarboxylate, bis(6-methyl-3,4-epoxycyclohexyl)adipate, 2-(3,4-epoxycyclohexyl)ethyltrimethoxysilane, and the like.

In one implementation, when 3,4-epoxycyclohexylmethyl-3',4'-epoxycyclohexanecarboxylate is used as the alicyclic epoxy group-containing compound (A1), the adhesive composition may exhibit the more excellent initial curability and reliability.

The alicyclic epoxy group-containing compound (A1) may be prepared by the synthesis in reference to conventionally known processes, or may be commercially available products. Commercially available products may include, for example, Epolead® Series, CELLOXIDE® Series (Daicel Corp.), etc. In addition, the alicyclic epoxy group-containing compound (A1) may be used alone or in combination of two or more thereof.

Aromatic Group- and Epoxy Group-containing Compound (A2)

An aromatic group- and epoxy group-containing compound (A2) refers to a compound having an aromatic group and an epoxy group in a molecule other than the alicyclic epoxy group-containing compound (A1) (i.e., a compound not having an alicyclic epoxy group). The aromatic group- and epoxy group-containing compound (A2) may have at least one epoxy group in a molecule, for example, two or more epoxy groups in a molecule. By this, a cross-linked structure may form and an adhesive layer may have an increased modulus of elasticity after curing. As a result, a change in volume generated by the heat may become lower and thus an occurrence of an internal stress, namely a reduction in strength may be suppressed and cracks of the polarizers in a thermal shock test may be more still suppressed.

The aromatic group- and epoxy group-containing compound (A2) may include, for example, phenyl glycidyl ether, bisphenol A type diglycidyl ether, bisphenol F type diglycidyl ether, bisphenol S type diglycidyl ether, bisphenol AD type diglycidyl ether, glycidyl ether of 3,3',5,5'-tetramethyl-4,4'-biphenol, glycidyl ether of phenol Novolac resin, glycidyl ether of cresol Novolac resin, glycidyl ether of phenolaralkyl resin, glycidyl ether of naphtholaralkyl resin, glycidyl ether of phenol dicyclopentadiene resin, glycidylamino compound of 1,3-phenylene diamine, glycidylamino compound of 1,4-phenylene diamine, glycidylamino compound of 3-aminophenol, glycidyl ether compound of 3-aminophenol, glycidylamino compound of 4-aminophenol, glycidyl ether compound of 4-aminophenol, and the like.

In implementations, when phenyl glycidyl ether, bisphenol F type diglycidyl ether or bisphenol A type diglycidyl ether is used as the aromatic group- and epoxy group-containing compound (A2), the adhesive composition may exhibit superior adhesion.

The aromatic group- and epoxy group-containing compound (A2) may be prepared by the synthesis in reference to conventionally known processes, or may be commercially available products. Commercially available products may include, for example, EPICLON® EXA-830CRP (DIC Co., Ltd.), DENACOL® EX-201, DENACOL EX-721, DENACOL EX-141 (Nagase ChemteX Corp.), etc. In addition, the aromatic group- and epoxy group-containing compound (A2) may be used alone or in combination of two or more thereof.

Alicyclic Group- and Epoxy Group-containing Compound (A3)

An alicyclic group- and epoxy group-containing compound (A3) refers to a compound having an alicyclic (cycloalkyl) group and an epoxy group in a molecule other than the alicyclic epoxy group-containing compound (A1) and the aromatic group- and epoxy group-containing compound (A2) (i.e., a compound not having an alicyclic epoxy group and/or an aromatic group). The alicyclic group- and epoxy group-containing compound (A3) may have at least one epoxy group in a molecule, for example, two or more epoxy groups in a molecule. By this, a cross-linked structure may form and an adhesive layer may have an increased modulus of elasticity after curing. As a result, a change in volume generated by the heat may become lower and thus an occurrence of an internal stress, namely a reduction in strength may be suppressed and cracks of the polarizers in a thermal shock test may be more still suppressed.

The alicyclic group- and epoxy group-containing compound (A3) may include, for example, cyclohexane dimethanol diglycidyl ether, dicyclopentenyl dialcohol diglycidyl ether, diglycidyl ether of hydrogenated bisphenol A, dihydroxyterpene diglycidyl ether, and the like.

In one implementation, when cyclohexane dimethanol diglycidyl ether is used as the alicyclic group- and epoxy group-containing compound (A3), the adhesive composition may exhibit superior adhesion.

The alicyclic group- and epoxy group-containing compound (A3) may be prepared by the synthesis in reference to conventionally known processes, or may be commercially available products. Commercially available products may include, for example, DENACOL EX-216L (Nagase ChemteX Corp.), etc. In addition, the alicyclic group- and epoxy group-containing compound (A3) may be used alone or in combination of two or more thereof.

(Meth)Acrylate Monomer (B)

In one embodiment, an adhesive composition includes a (meth)acrylate monomer (B). Also, as used herein, the term [(meth)acrylate] refers to collectively acrylate and metacrylate. The (meth)acrylate monomer (B) refers to a compound having a (meth)acryloyl group in a molecule, and may be one or more of a monofunctional (meth)acrylate monomer having one (meth)acryloyl group in a molecule (B1) and a polyfunctional (meth)acrylate monomer having two or more (meth)acryloyl groups in a molecule (B2).

The monofunctional (meth)acrylate monomer (B1) may include, for example, methyl (meth)acrylate, ethyl (meth)acrylate, methylpenoxyethyl (meth)acrylate, n-propyl (meth)acrylate, n-butyl (meth)acrylate, isobutyl (meth)acrylate, tert-butyl (meth)acrylate, pentyl (meth)acrylate, cyclohexyl (meth)acrylate, 2-ethylhexyl (meth)acrylate, lauryl (meth)acrylate, (meth)acrylate, 2-methoxyethyl (meth)acrylate, (meth)acrylate, 2-hydroxyethyl (meth)acrylate, 2-hydroxypropyl (meth)acrylate, 2-hydroxybutyl (meth)acrylate, 4-hydroxybutyl (meth)acrylate, glycerol mono(meth)acrylate, benzyl (meth)acrylate, 3-chloro-2-hydroxypropyl (meth)acrylate, 2-hydroxy-3-penoxypropyl (meth)acrylate, penoxydiethylene glycol (meth)acrylate, isobornyl (meth)acrylate, N-vinyl pyrrolidone, acryloylmorpholine, urethane (meth)acrylate, tetrahydrofurfuryl (meth)acrylate, (meth) acrylate of mono ε-caprolactone adducts of tetrahydrofurfuryl alcohol, (meth)acrylate of di ε-caprolactone adducts of tetrahydrofurfuryl alcohol, (meth)acrylate of mono β-methyl-δ-valerolactone adducts of tetrahydrofurfuryl alcohol, (meth)acrylate of di β-methyl-δ-valerolactone adducts of tetrahydrofurfuryl alcohol, ω-carboxy-polycaprolactone monoacrylate, acrylonitrile, methacrylonitrile, (meth)acrylamide, N-methyl (meth)acrylamide, N-ethyl (meth)acrylamide, N-propyl (meth)acrylamide, N-isopropyl (meth)acrylamide, N-butyl (meth)acrylamide, N,N-dimethyl (meth)acrylamide, N,N-diethyl (meth)acrylamide, N,N-dimethylaminopropyl (meth)acrylamide, N-(hydroxyethyl) acrylamide, N-isopropyl (meth)acrylamide, N-methylol (meth)acrylamide, diacetone (meth)acrylamide, and the like.

The polyfunctional (meth)acrylate monomer (B2) may include, for example, N,N-methylene bis(meth)acrylamide, ethylene glycol di(meth)acrylate, 2-hydroxy-3-acryloyloxypropyl methacrylate, penoxyethylene glycol di(meth)acrylate, diethylene glycol di(meth)acrylate, triethylene glycol di(meth)acrylate, penoxytriethylene glycol di(meth)acrylate, butylene glycol di(meth)acrylate, nonaethylene glycol di(meth)acrylate, polypropylene glycol di(meth)acrylate, dipropylene glycol di(meth)acrylate, neopentyl glycol di(meth)acrylate, 1,3-butanediol di(meth)acrylate, 1,4-butanediol di(meth)acrylate, 1,6-hexanediol di(meth)acrylate, trimethylolpropane tri(meth)acrylate, neopentyl glycol di(meth)acrylate, pentaerythritol tri(meth)acrylate, trimethylolmethane tri(meth)acrylate, and the like.

In one implementation, when 4-hydroxybutyl (meth)acrylate, benzyl (meth)acrylate and/or 2-hydroxy-3-acryloyloxypropyl methacrylate is used, the adhesive composition may exhibit superior adhesion.

In another implementation, when trimethylolpropane tri(meth)acrylate and/or 2-hydroxy-3-acryloyloxypropyl methacrylate is used, the adhesive composition may exhibit superior reliability.

The acrylic monomer may be commercially available products, for example, KAYARAD Series (Nihon Kayaku Co., Ltd.), NK ester Series (Shinnakamura Kagaku Kogyo Co., Ltd.), KOEIHARD Series (KOEI Kagaku Kogyo Co., Ltd.), SEIKABEAM® Series (Dainichi Seika Kogyo K.K.), KRM Series (Daicel Cytec Co., Ltd.), EB Series, UVECRYL® Series (Daicel UCB Co., Ltd.), ACRYDIC Series (DIC Co., Ltd.), Olex® Series (Chugoku Paints Co., Ltd.), SANRAD® Series (Sanyo Kasei Kogyo Co., Ltd.), RCC Series (Grace Japan Co., Ltd.), ARONIX® Series (Toagosei Co., Ltd.), Light acrylate Series (Kyoeisha Kagaku Co., Ltd.), and the like. In addition, the (meth)acrylate monomer (B) may be used alone or in combination of two or more thereof.

Content of Components (A) and (B)

In an embodiment, the adhesive composition may include about 50 parts by weight to about 90 parts by weight of the epoxy group-containing compound (A) and about 10 parts by weight to about 50 parts by weight of the (meth)acrylate monomer (B), based on 100 parts by weight of the total amount of the epoxy group-containing compound (A) and the (meth)acrylate monomer (B). In addition, the epoxy group-containing compound (A) may include about 50 parts by weight to about 95 parts by weight of the alicyclic epoxy group-containing compound (A1) and about 1 part by weight to about 50 parts by weight, or about 5 parts by weight to about 50 parts by weight of the aromatic group- and epoxy group-containing compound (A2), based on a total 100 parts by weight of the epoxy group-containing compound (A).

When the epoxy group-containing compound (A) is present in an amount of less than about 50 parts by weight (i.e., the (meth)acrylate monomer (B) is present in an amount of more than about 50 parts by weight), it is difficult to achieve a desired adhesion and reliability. Meanwhile, when the epoxy group-containing compound (A) is present in an amount of more than about 90 parts by weight (i.e., the (meth)acrylate monomer (B) is present in an amount of less than about 10 parts by weight), an initial curability may not be sufficient.

Further, when the alicyclic epoxy group-containing compound (A1) is present in an amount of less than about 50 parts by weight (i.e., the aromatic group- and epoxy group-containing compound (A2) is present in an amount of more than about 50 parts by weight) based on 100 parts by weight of the epoxy group-containing compound (A), an initial curability or reliability may be deteriorated. Meanwhile, when the alicyclic epoxy group-containing compound (A1) is present in an amount of more than about 95 parts by weight (i.e., the aromatic group- and epoxy group-containing compound (A2) is present in an amount of less than about 1 part by weight or less than about 5 parts by weight) based on 100 parts by weight of the epoxy group-containing compound (A), an adhesion may be deteriorated.

In embodiments, the epoxy group-containing compound (A) may include about 50 parts by weight to about 95 parts by weight, about 50 parts by weight to about 80 parts by weight, or about 55 parts by weight to about 80 parts by weight of the alicyclic epoxy group-containing compound (A1), based on 100 parts by weight of the total epoxy group-containing compound (A).

In embodiments, the epoxy group-containing compound (A) may include about 1 part by weight to about 50 parts by weight, about 1 part by weight to about 40 parts by weight, about 5 parts by weight to about 40 parts by weight, about 1 part by weight to about 27 parts by weight, about 5 parts by weight to about 27 parts by weight, or about 10 parts by weight to about 27 parts by weight of the aromatic group- and epoxy group-containing compound (A2), based on 100 parts by weight of the total epoxy group-containing compound (A).

The adhesive composition may include primarily the epoxy group-containing compound (A) having a particular structure, as described above. It is believed that the epoxy group-containing compound (A) has a low curing distortion (volume shrinkage in curing) resulting in an increase in adhesion. It is also believed that the adhesive layer may exhibit a high rigidity while being deformed, resulting in an increase in peel strength when a peel stress is applied since a blend of the alicyclic epoxy group-containing compound (A1) having a hard structure and the aromatic group- and epoxy group-containing compound (A2) having a soft structure at a given range is used as the epoxy group-containing compound (A).

The components (A1) and (A2) used in the epoxy group-containing compound (A) may have a weight ratio (A1:A2) of about 1:1 or more to about 95:1 or less. For example, the weight ratio (A1:A2) of the components (A1) and (A2) may have a lower limit of about 1:1 or more, about 1.5:1 or more, about 2.3:1 or more, about 3:1 or more, about 4:1 or more, about 5.5:1 or more, about 6:1 or more, or about 7:1 or more, and an upper limit of about 95:1 or less, about 80:1 or less, about 55:1 or less, about 50:1 or less, about 19:1 or less or about 12:1 or less. Within this range, it is possible to form the adhesive composition having an increased adhesion.

In implements, the components (A1) and (A2) used in the epoxy group-containing compound (A) may have a weight ratio (A1:A2) of about 3:1 to about 95:1, about 3:1 to about 55:1, about 3:1 to about 19:1, or about 3:1 to about 12:1. Within this range, it is possible to form the adhesive composition having an increased adhesion for the protective film made of cycloolefin polymers, polyester resins, acrylic resins, etc.

In another embodiment of an adhesive composition, the epoxy group-containing compound (A) may include more than about 0 part by weight and about 40 parts by weight or less of an alicyclic group- and epoxy group-containing compound (A3) as an optional component, based on 100 parts by weight of the total epoxy group-containing compound (A). In embodiments, the epoxy group-containing compound (A) may include about 0 part by weight to about 40 parts by weight, about 1 part by weight to about 40 parts by weight, about 10 parts by weight to about 40 parts by weight, or about 10 parts by weight to about 25 parts by weight of the alicyclic group- and epoxy group-containing compound (A3), based on 100 parts by weight of the total epoxy group-containing compound (A). The adhesive layer may be more flexibly deformed when a peel stress is applied because the alicyclic group- and epoxy group-containing compound (A3) has the softer structure than that of the aromatic group- and epoxy group-containing compound (A2). As a result, it is possible to form the adhesive composition having an increased adhesion while maintaining a sufficient reliability. In one implementation, the epoxy group-containing compound (A) may include the components (A1) to (A3) in a weight ratio ((A1):(A2):(A3)) of about 50 parts by weight to about 80 parts by weight: about 1 part by weight to about 40 parts by weight: about 1 part by weight to about 40 parts by weight, or in a weight ratio ((A1):(A2):(A3)) of about 55 parts by weight to about 80 parts by weight: about 10 parts by weight to about 25 parts by weight: about 10 parts by weight to about 25 parts by weight, based on 100 parts by weight of the total epoxy group-containing compound (A). Within this range, the adhesive composition may have an increased adhesion while maintaining a sufficient reliability and initial curability.

In another implementation, the epoxy group-containing compound (A) may include the components (A1) to (A3) in a weight ratio ((A1):(A2):(A3)) of about 50 parts by weight to about 80 parts by weight: about 1 part by weight to about 27 parts by weight: about 1 part by weight to about 40 parts by weight, or in a weight ratio ((A1):(A2):(A3)) of about 55 parts by weight to about 80 parts by weight: about 10 parts by weight to about 27 parts by weight: about 10 parts by weight to about 25 parts by weight, based on 100 parts by weight of the total epoxy group-containing compound (A). Within this range, the adhesive composition may have an increased adhesion while maintaining a sufficient reliability and initial curability.

In one embodiment, an adhesive composition may include more than about 0 part by weight and about 100 parts by weight or less of a polyfunctional (meth)acrylate monomer (B2), based on a total of 100 parts by weight of the (meth)acrylate monomer (B) (i.e., at least a portion of the (meth)acrylate monomer (B) may be the polyfunctional (meth)acrylate monomer (B2)). In particularly, the polyfunctional (meth)acrylate monomer (B2) may be present in an amount of about 30 parts by weight to about 100 parts by weight, or about 50 parts by weight to about 100 parts by weight in the (meth)acrylate monomer (B). In this case, the polyfunctional (meth)acrylate monomer (B2) may be combined, and thus a cross-linked structure forms and an adhesive layer may have an increased modulus of elasticity after curing. As a result, a change in volume generated by the heat may become lower and thus an occurrence of an internal stress, namely a reduction in strength may be suppressed and cracks of the polarizers in a thermal shock test may be more still suppressed.

In one implementation, when the polyfunctional (meth)acrylate monomer (B2) is present in an amount of 100 parts by weight in the (meth)acrylate monomer (B), the epoxy group-containing compound (A) may include about 60 parts by weight to about 95 parts by weight of the alicyclic epoxy group-containing compound (A1) and about 5 parts by weight to about 40 parts by weight of the aromatic group- and epoxy group-containing compound (A2). Within this range, it is possible to form the adhesive composition having an increased reliability while maintaining a sufficient adhesion.

In another implementation, when the polyfunctional (meth)acrylate monomer (B2) is present in an amount of 100 parts by weight in the (meth)acrylate monomer (B), the epoxy group-containing compound (A) may include the alicyclic epoxy group-containing compound (A1) and the aromatic group- and epoxy group-containing compound (A2), and further include more than about 0 part by weight and about 40 parts by weight or less of the alicyclic group- and epoxy group-containing and aromatic group-free compound (A3), based on a total of 100 parts by weight of the epoxy group-containing compound (A). In this case, an adhesive layer may have an increased modulus of elasticity after curing. As a result, a change in volume generated by the heat may become lower and thus an occurrence of an internal stress, namely a reduction in strength may be suppressed and cracks of the polarizers in a thermal shock test may be more still suppressed.

In implementations, when the polyfunctional (meth)acrylate monomer (B2) is present in an amount of 100 parts by weight in the (meth)acrylate monomer (B), the components (A1) and (A2) used in the epoxy group-containing compound (A) may have a weight ratio (A1:A2) of about 2:1 to about 19:1, about 3:1 to about 19:1, or about 3:1 to about 12:1. Within this range, it is possible to form the adhesive composition having an increased adhesion.

Photoacid Generator (C)

A photoacid generator refers to a compound generating a strong acid when irritated by the light. The strong acid attacks the epoxy group-containing compound, thereby initiating the epoxy group-containing compound.

As a photoacid generator, any compounds commonly used as a photoacid generator may be used without limitation. Examples of the photoacid generator may include onium salts, such as aromatic diazonium salts, aromatic iodonium salts, aromatic sulfonium salts, and the like, iron-arene complex, and the like. These may be used alone or in combination of two or more thereof.

The aromatic diazonium salt may include, for example, benzene diazonium hexafluoroantimonate, benzene diazonium hexafluorophosphate, benzenediazonium hexafluoroborate, and the like.

The aromatic iodonium salt may include, for example, diphenyl iodonium tetrakis(pentafluorophenyl)borate, diphenyl iodonium hexafluorophosphate, diphenyl iodonium hexafluoroantimonate, di(4-nonylphenyl)iodonium hexafluorophosphate, and the like.

The aromatic sulfonium salt may include, for example, triphenyl sulfonium hexafluorophosphate, triphenyl sulfonium hexafluoroantimonate, triphenyl sulfonium tetrakis(pentafluorophenyl)borate, diphenyl[4-(phenylthio)phenyl]sulfonium hexafluoroantimonate, 4,4'-bis[diphenylsulfonio]diphenylsulfide bishexafluorophosphate, 4,4'-bis[di(β-hydroxyethoxy)phenylsulfonio]diphenylsulfide bishexafluoroantimonate, 4,4'-bis[di(β-hydroxyethoxy)phenylsulfonio]diphenylsulfide bishexafluorophosphate, 7-[di(p-toluyl)sulfonio]-2-isopropylthioxanthone hexafluoroantimonate, 7-[di(p-toluyl)sulfonio]-2-isopropylthioxanthone tetrakis(pentafluorophenyl)borate, 4-phenylcarbonyl-4'-diphenylsulfonio-diphenylsulfide hexafluorophosphate, 4-(p-tert-butylphenylcarbonyl)-4'-diphenylsulfonio-diphenylsulfide hexafluoroantimonate, 4-(p-tert-butylphenylcarbonyl)-4'-di(p-toluyl)sulfonio-diphenylsulfide tetrakis(pentafluorophenyl)borate, diphenyl[4-(phenylthio)phenyl]sulfonium phosphate, and the like.

The iron-arene complex may include, for example, xylene-cyclopentadienyl iron (II) hexafluoroantimonate, cumene-cyclopentadienyl iron (II) hexafluorophosphate, xylene-cyclopentadienyl iron (II)-tris(trifluoromethylsulfonyl)methanide, and the like.

The photoacid generator is commercially available, and examples of the photoacid generator may include CPI-100P, 101A, 200K, 210S (SAN-APRO Co., Ltd.), KAYARAD® PCI-220, PCI-620 (Nihon Kayaku Co., Ltd.), UVI-6990 (Union Carbide Co., Ltd.), Adekaoptomer® SP-150, SP-170 (ADEKA Co., Ltd.), CI-5102 (Nihon Soda Co., Ltd.), CIT-1370, 1682 (Nihon Soda Co., Ltd.), CIP-1866S, 2048S, 2064S (Nihon Soda Co., Ltd.), DPI-101, 102, 103, 105 (Midori Kagaku Co., Ltd.), MPI-103, 105 (Midori Kagaku Co., Ltd.), BBI-101, 102, 103, 105 (Midori Kagaku Co., Ltd.), TPS-101, 102, 103, 105 (Midori Kagaku Co., Ltd.), MDS-103, 105 (Midori Kagaku Co., Ltd.), DTS-102, 103 (Midori Kagaku Co., Ltd.), PI-2074 (Rodia Japan Co., Ltd.), and the like.

The photoacid generator may be present in an amount of about 1 part by weight to about 7 parts by weight, for example about 1.5 parts by weight to about 4 parts by weight, based on 100 parts by weight of the polymerizable component (a total weight of the epoxy group-containing compound (A) and the (meth)acrylate monomer (B)). When the photoacid generator is used in an amount of about 1 part by weight or more, the adhesive composition after ultraviolet irradiation may have favorable curing properties. Meanwhile, when the photoacid generator is used in an amount of about 7 parts by weight or less, it is possible to prevent the adhesive composition exhibiting insufficient adhesion or durability by the bleed out component.

Photopolymerization Initiator and Photosensitizer (D)

In one embodiment, an adhesive composition may further include at least one of a photopolymerization initiator and a photosensitizer. The photopolymerization initiator is not particularly limited, and the conventionally known photopolymerization initiators may be used. The photopolymerization initiator may be used alone or in combination of two or more thereof.

Examples of the photopolymerization initiator may include inorganic peroxides such as hydrogen peroxide, potassium persulfate, ammonium persulfate, and the like, organic peroxides such as t-butyl hydroperoxide, t-dibutyl peroxide, cumene hydroperoxide, acetyl peroxide, benzoyl peroxide, lauroyl peroxide, and the like, azo compounds such as azobisisobutyronitrile, azobis-2,4-dimethyl valeronitrile, azobiscyclohexane carbonitrile, azobisisobutyric acid methyl, azobisisobutylamidine hydrochloride, azobiscyanovaleric acid, and the like, acetophenones, benzoins, benzophenones, phosphine oxides, ketals, anthraquinones, thioxanthones, 2,3-dialkyldione compounds, disulfide compounds, fluoroamine compounds, aromatic sulfoniums, Ropin dimers, onium salts, borate salts, active esters, active halogens, inorganic complexes, coumarines, and the like.

For example, the photopolymerization initiator may include acetophenones such as acetophenone, 3-methylacetophenone, benzyldimethylketal, 1-(4-isopropylphenyl)-2-hydroxy-2-methylpropane-1-on, 2-methyl-1-[4-(methylthio)phenyl]-2-morpholinopropane-1-one, 2-hydroxy-2-methyl-1-phenyl propane-1-one, and the like; benzophenones such as benzophenone, 4-chlorobenzophenone, 4,4'-diamino benzophenone, and the like; benzoin ethers such as benzoin propylether, benzoin ethylether, and the like; thioxanthones such as 4-isopropylthioxanthone, and the like; xanthone, fluorenone, camphorquinone, benzaldehyde, anthraquinone, and the like.

The photopolymerization initiator may be commercially available. Examples of the photopolymerization initiator may include IRGACURE®-184, 819, 907, 651, 1700, 1800, 819, 369, 261, DAROCUR-TPO (BASF JAPAN Co., Ltd.), DAROCUR®-1173 (Merck Co., Ltd.), Esacure-KIP150, TZT (DKSH JAPAN Co., Ltd.), KAYACURE® BMS, DMBI (Nppon Kayaku Co. Ltd.), and the like.

The inorganic peroxide and organic peroxide may be used in combination with amines such as ethylamine, triethanolamine, dimethylaniline, and the like; polyamine; divalent iron salt compounds; ammonia; organic metal compounds such as triethylaluminium, triethylboron, diethylzinc, and the like; suitable reducing agents such as sodium sulfite, sodium hydrogen sulfite, cobalt naphthenate, sulfinic acid, mercaptan, and the like.

In one embodiment, an adhesive composition may include photosensitizers, instead of photopolymerization initiators, or in combination with photopolymerization initiators. The photosensitizer is not particularly limited, and the conventionally known photosensitizers may be used. The photosensitizer may be used alone or in combination of two or more thereof.

Specific examples of the photosensitizer may include, for example, anthracene compounds, pyrene compounds, carbonyl compounds, organic sulfur compounds, persulfides, redox compounds, azo and diazo compounds, halogen compounds, photoreductive dyes and the like. Two or more of these may be used in an admixture.

More specifically, photosensitizer may include, for example, an anthracene compound represented by the Formula 2; pyrene; benzoin derivatives such as benzoin methyl ether, benzoin isopropyl ether, α,α-dimethoxy-α-phenyl acetophenone and the like; benzophenone derivatives such as benzophenone, 2,4-dichlorobenzophenone, o-benzoylbenzoic acid methyl, 4,4'-bis(dimethylamino)benzophenone, 4,4'-bis(diethylamino)benzophenone and the like; thioxanthone derivatives such as 2-chlorothioxanthone 2-isopropyl thioxanthone and the like; anthraquinone derivatives such as 2-chloroanthraquinone 2-methylanthraquinone and the like; acridine derivatives such as N-methylacridine N-butylacridine and the like; others such as α,α-diethoxy acetophenone, benzyl, fluorenone, xanthone, uranyl compounds, halogen compounds and the like.

[Formula 2]

wherein, R and R' are each independently a linear, branched, or cyclic $C_1$ to $C_{18}$ alkyl group, or $C_2$ to $C_{18}$ ether group, and R" is a hydrogen atom or a linear, branched, or cyclic $C_1$ to $C_{18}$ alkyl group.

In Formula 2, the linear, branched, or cyclic $C_1$ to $C_{18}$ alkyl group represented by R, R' and R" may include methyl group, ethyl group, propyl group, isopropyl group, butyl, sec-butyl group, tert-butyl group, isobutyl group, amyl group, isoamyl group, tert-amyl group, n-hexyl group, 2-hexyl group, 3-hexyl group, cyclohexyl group, 1-methylcyclohexyl group, n-heptyl group, 2-heptyl group, 3-heptyl group, isoheptyl group, tert-heptyl group, n-octyl group, isooctyl group, tert-octyl group, 2-ethylhexyl group, nonyl group, isononyl group, decyl group, dodecyl group, tridecyl group, tetradecyl group, pentadecyl group, hexadecyl group, heptadecyl group, octadecyl group, and the like. The $C_2$ to $C_{18}$ ether group represented by R and R' may include 2-methoxyethyl group, 2-ethoxyethyl group, 2-butoxyethyl group, 2-penoxyethyl group, 2-(2-methoxyethoxy)ethyl group, 3-methoxypropyl group, 3-butoxypropyl group, 3-penoxypropyl group, 2-methoxy-1-methylethyl group, 2-methoxy-2-methylethyl group, 2-methoxyethyl group, 2-ethoxyethyl group, 2-butoxyethyl group, 2-penoxyethyl group, and the like. As used herein, the ether group refers to a hydrocarbon group having at least one ether bond, and includes alkoxyalkyl group, alkoxyalkoxyalkyl group, aryloxyalkyl group, and the like.

A synthetic product or a commercial product may be used as the photosensitizer. Examples of the commercial product may include, for example, Kayacure®-DMBI, BDMK, BP-100, BMBI, DETX-S, and EPA (manufactured by Nippon Kayaku Co., Ltd.), Anthracure® UVS-1331 and UVS-1221 (manufactured by Kawasaki Kasei Chemicals Ltd.), and Ebecryl P102, 103, 104, and 105 (manufactured by UCB S.A.).

At least one of the photopolymerization initiator and the photosensitizer may be present in an usage amount (when the photopolymerization initiator and the photosensitizer are used together, it is a sum of the usage amount of each component) of about 0.1 parts by weight to about 7 parts by weight, specifically about 0.5 parts by weight to about 2.5 parts by weight, based on 100 parts by weight of the polymeric component (a total weight of the epoxy group-containing compound (A) and the (meth)acrylate monomer (B)). When the usage amount is less than about 0.1 parts by weight, it is difficult to cure the adhesive composition even under ultraviolet radiation, and when the usage amount is more than about 7 parts by weight, there is a possibility of generating insufficient adhesion or durability by the bleed out component.

Other Component

In one embodiment, an adhesive composition may include, if necessary, other components, in addition to the above-described components (A) to (D), to such an extent that the components may not significantly decrease the effects of the adhesive composition.

Other components may include, for example, other polymerizable components other than the above-described polymerizable component, ultraviolet absorbing agents, antioxidants, thermal stabilizers, silane coupling agents, inorganic fillers, softening agents, anti-oxidant agents, anti-aging agents, stabilizers, tackifying resins, modified resins (such as polyol resins, phenol resins, acrylic resins, polyester resins, and polyolefin resins), leveling agents, defoaming agents, plasticizers, dyes, pigments (such as coloring pigments and body pigments), treating agents, UV blocking agents, fluorescent brighteners, dispersing agents, light stabilizers, antistatic agents, lubricants, and the like.

The adhesive composition may include about 50 parts by weight or less, about 30 parts by weight or less, about 20 parts by weight or less, about 10 parts by weight or less, or about 5 parts by weight or less of the other component, based on a total of 100 parts by weight of the adhesive composition. When other components are within this range, the adhesive composition of the embodiment may exhibit its effect sufficiently.

Method for Manufacturing Adhesive Composition for Polarizing Plates

A method for manufacturing an adhesive composition of the present invention is not particularly limited, and generally, the above-described components are mixed to obtain an adhesive composition. In order to adjust viscosity, a suitable organic solvent may be used. A mixing method is not particularly limited, and the components may be mixed while being sufficiently stirred in a chamber with UV lights blocked at a room temperature (25° C.) until a uniform liquid is obtained.

<Polarizing Plate>

Another embodiment of the present invention relates to a polarizing plate including a protective film and a polarizer bonded to each other using the adhesive composition for polarizing plates. The polarizing plate of the embodiment exhibits a good processability in a process and sufficient adhesion and reliability. Hereinafter, configurations of the polarizing plates of the present invention will be described in detail.

Polarizer

The polarizer is not particularly limited and the conventionally known polarizers may be used. Examples of the polarizer may include a polarizer prepared by adsorbing a dichroic material such as iodine or a dichroic dye into a hydrophilic polymer film such as a polyvinyl alcohol film, partially formalized polyvinyl alcohol film, ethylene-vinyl acetate copolymer-based partially saponified film, and the like, followed by uniaxial stretching, or a polyene oriented film such as a dehydrated material of polyvinyl alcohol or a dehydrochlorinated material of polyvinyl chloride, or the like.

Among these, a polarizer prepared by dyeing a polyvinyl alcohol film having an average degree of polymerization of about 2000 to about 2800 and a degree of saponification of about 90 mol % to about 100 mol % with iodine, followed by uniaxial stretching by a stretch ratio of about 5 times to about 6 times may used. More specifically, such a polarizer is obtained, for example, by dipping, dyeing and stretching a polyvinyl alcohol film in an aqueous solution of iodine. For example, an aqueous solution in which about 0.1 wt % to about 10 wt % of iodine/potassium iodide is dissolved may be used as an aqueous solution of iodine. The polyvinyl alcohol film may be dipped in an aqueous solution of boric acid or potassium iodide at about 50° C. to about 70° C., as needed. Further, in order to prevent washing operation or dye spots, the polyvinyl alcohol film may be dipped in water at about 25° C. to about 35° C. Stretching may be performed after dyeing with iodine, or may be performed together with dyeing. Alternatively, dyeing with iodine may be performed after stretching. After completion of dyeing and stretching, the resultant may be flushed with water and dried at about 35° C. to about 55° C. for about 1 minute to about 10 minutes.

Protective Film

A material having good transparency, mechanical strength, thermal stability, moisture blocking properties, isotropic properties, and the like may be used as a protective film. Examples of materials for the protective film may include cellulose resins, such as cellulose diacetate, cellulose triacetate, and the like; polyester resins, such as polyethylene terephthalate, polyethylene naphthalate, and the like; acrylic resins, such as polymethyl methacrylate and the like; styrene resins, such as polystyrene, acrylonitrile-styrene copolymer (AS resin), and the like; polycarbonate resin; polyolefin resins, such as polyethylene, polypropylene, polyolefins having a cyclo or norbornene structure, ethylene-propylene copolymers, and the like; amide resins, such as vinyl chloride, nylon, aromatic polyamide, and the like; imide resins; sulfone resins; polyether sulfone resins; polyetheretherketone resins; polyphenylene sulfide resins; vinylalcohol resins; vinylidene chloride resins; vinylbutyral resins; allylate resins; polyoxymethylene resins; epoxy resins; and blends thereof.

Among these, a cellulose resin which is an ester of cellulose and a fatty acid, or a cycloolefin polymer (COP film), a polyethylene terephthalate (PET film), or an acrylic resin is preferred as a protective film for polarizing plates. Examples of the cellulose resin may include cellulose triacetate (TAC film), cellulose diacetate, cellulose tripropionate, cellulose dipropionate, and the like. Among these, a cellulose triacetate (TAC Film), a cycloolefin polymer (COP Film), a polyethylene terephthalate (PET film), or an acrylic resin is particularly preferred in view of commercial availability and cost, and cycloolefin polymer (COP Film), polyethylene terephthalate (PET film), or acrylic resin are particularly preferable in view of commercial availability and moisture permeability. When the moisture permeability of the protective film is high, water penetrates into the protective film and easily enters the polarizer side, so that quality of the polarizer may decrease. However, when the cycloolefin polymer (COP Film), the polyethylene terephthalate (PET film), or the acrylic resin is used, it is possible to significantly address this problem. In particularly, the cycloolefin polymer (COP Film) and the polyethylene terephthalate (PET film) may be used together.

In one implementation, when the polarizing plate include the PET film as the protective film, a peel strength (peel strength PET) between the polarizer and the PET film may be about 3 (N/25 mm) or more, and more preferably about 5 (N/25 mm) or more under conditions of a peel angle of 90° and a peel rate of 300 mm/min. In such case, the upper limit of the peel strength is not particularly limited, but may be, for example, about 50 (N/25 mm) or less, or about 25 (N/25 mm) or less.

In another implementation, when the polarizing plate include the COP film as the protective film, a peel strength (peel strength COP) between the polarizer and the COP film may be about 1.5 (N/25 mm) or more, preferably about 2.0 (N/25 mm) or more, more specifically about 2.1 (N/25 mm) or more, and still more preferably about 2.2 (N/25 mm) or more, about 2.3 (N/25 mm) or more, or about 2.5 (N/25 mm) or more under conditions of a peel angle of 90° and a peel rate of 300 mm/min. In such case, the upper limit of the peel strength is not particularly limited, but may be, for example, about 50 (N/25 mm) or less, or about 25 (N/25 mm) or less In the above, the peel strength may be determined by the evaluation method of peel strength as described in Examples after preparing the polarizing plate using the adhesive composition according to the present invention.

Further, not only a saponified cellulose triacetate but unsaponified cellulose triacetate may be used. The polymers having a polymer obtained by a hydrogenation reaction of an open-ring polymer of tetracyclododecyl as a component, as disclosed in Japanese Patent publication No. H2-9619, may be used as the cycloolefin polymer.

Commercially available COP film may include Arton® (JSR Co., Ltd.), ZEONEX® Series, ZEONOR® Series (Nippon Zeon Co., Ltd.), and the like.

Commercially available PET film may include COS-MOSHINE® Series (TOYOBO Co., Ltd.).

Commercially available acrylic resin film may include acrylFilm RT, SO, HI Series (KURARAY Co., Ltd.), and the like.

Commercially available TAC film may include UV-50, UV-80, SH-80, TD-80U, TD-TAC, UZ-TAC (all manufactured by Fuji film Co., Ltd.), KC Series (Konica-Minolta Opto Co., Ltd.), and the like.

The surface of the protective film may be modified by the corona discharge treatment. A method of corona discharge treatment is not particularly limited. A typical corona discharge treatment device (for example, a device manufactured by Gasga Denki Co, Ltd.) may be used for treatment. By the corona discharge treatment, an active group such as a hydroxyl group may be formed on the surface of the protective film. It is considered that such an active group contributes to an increase in the adhesive property. When the saponified cellulose triacetate is used as the protective film, since an increase in the adhesive property as in the corona discharge treatment may be expected, the corona discharge treatment is not necessarily required. However, considering that the saponification treatment is expensive due to a complex process, it is preferred in the preparation process that cellulose triacetate obtained by subjecting the non-saponified cellulose triacetate to corona discharge treatment is used.

A discharge amount in the corona treatment is not particularly limited, and is about 30 W·min/m² to about 300 W·min/m², and more preferably about 50 W·min/m² to about 250 W·min/m². Within this range, it is possible to increase the adhesive property of the protective film and the adhesive without degrading the protective film itself. Here, the discharge amount is a working amount of an object by the corona discharge obtained by the following Equation 1, and a corona discharge power is determined based on the discharge amount.

$$\text{Discharge amount} = \frac{\text{Discharge Power}}{\text{Treatment rate of an object} \times \text{Length of an electrode}} \quad [\text{Equation 1}]$$

Method for Manufacturing Polarizing Plate

The method for manufacturing the polarizing plate is not particularly limited, and the polarizing plate may be manufactured by bonding the protective film and the polarizer using the adhesive composition of the present invention according to conventionally known methods. The applied adhesive composition exhibits the adhesive property upon ultraviolet radiation and forms an adhesive layer.

The adhesive composition may be applied to one or both of the protective film and the polarizer. The adhesive composition may be applied such that the dried adhesive layer has a thickness of about 10 nm to about 5 μm. The adhesive layer may have, for example, a thickness of about 500 nm to about 3 μm to ensure a uniform in-plane thickness and sufficient adhesive force. The thickness of the adhesive layer may be adjusted by a solid concentration in the solution of the adhesive composition or a device used for applying the adhesive composition. Also, the thickness of the adhesive layer may be determined by observing a cross section using a scanning electron microscope (SEM). A method of applying the adhesive composition is not particularly limited, and various methods may be used, for example, direct dropping, roll coating, spraying, dipping, and the like.

After the adhesive composition is applied, the polarizer and the protective film are bonded by a roll laminator, and the like.

After bonding, ultraviolet light is irradiated on the polarizing plate to cure the adhesive composition. A light source of the ultraviolet light is not particularly limited, but a low pressure mercury lamp, a medium pressure mercury lamp, a high pressure mercury lamp, a ultrahigh pressure mercury lamp, a chemical lamp, a blank light lamp, a microwave excitation mercury lamp, a metal halide lamp, and the like, which have a light emission distribution below a wavelength of about 400 nm or less, may be used. A dose of ultraviolet radiation is not particularly limited, but the dose of ultraviolet radiation in the wavelength range effective in activation of the polymerization initiator may be from about 100 mJ/cm² to about 2000 mJ/cm². Within this range, a suitable reaction time can be obtained, and there is no deterioration of the adhesive itself or the polarizing film due to heat radiated from a lamp and heat generated upon polymerization.

After ultraviolet radiation, since the epoxy resin is subjected to a dark reaction, the polarizing plate is maintained at a room temperature (about 23° C.) for about 16 hours to about 30 hours immediately after ultraviolet radiation. The polarizing plate is completed upon the completion of curing.

<Image Display Device>

In one embodiment of the present invention may provide the image display device include of the polarizing plate of the present invention. The image display device is not particularly limited, but a liquid crystal display device may be used as the image display device. The image display device of the embodiment may exhibit an excellent durability under harsh temperature conditions.

Mode for Invention

Hereinafter, the present invention will be described using Examples and Comparative Examples. However, the scope of the present invention is not limited to the following Examples.

EXAMPLES 1 to 14 AND COMPARATIVE EXAMPLES 1 to 4

<Preparation of Adhesive Composition>

The components shown in Table 1 were stirred and mixed according to the mixing amounts shown in Table 1 at a constant room temperature of 23° C. and a relative humidity of 50% until the mixture became uniform with naked eyes, so that adhesive compositions of Examples 1 to 14 and Comparative Examples 1 to 4 are obtained. In addition, the amounts of the adhesive composition shown in Tables 1 to 3 are represented in [g].

<Preparation of Polarizing Plate>

A polarizer was manufactured by the following method. A polyvinyl alcohol film having an average degree of polymerization of 2,400, a degree of saponification of 99.9%, and a thickness of 75 μm was swollen by dipping the polyvinyl alcohol film in hot water at 28° C. for 90 seconds. Then, the swollen polyvinyl alcohol film was dipped in an aqueous solution at a concentration of 0.6 wt % of iodine/potassium iodide (a weight ratio of 2/3), followed by dyeing while stretching by a stretch ratio of 2.1 times. Thereafter, the polyvinyl alcohol film was stretched in a boric acid ester aqueous solution at 60° C. by a stretch ratio of 5.8 times, washed with water, and dried at 45° C. for 3 minutes to obtain a polarizer (thickness: 25 μm).

Figure 1:
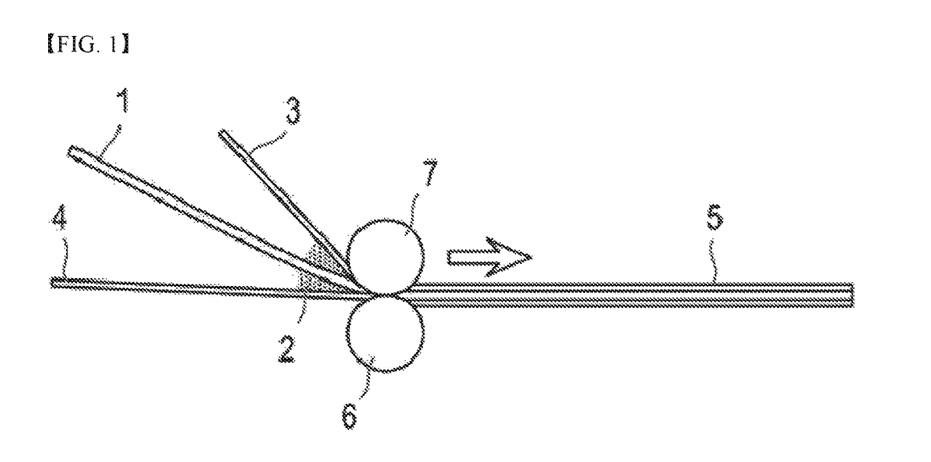
FIG. 1 illustrates a schematic view of a process for producing a polarizing plate in Examples.

FIG. 1 is a schematic view of a process for producing a polarizing plate in Examples. As illustrated in FIG. 1, a polarizer 1 was interposed between a protective film 3 (COP Film; ZEONEX®, Nippon Zeon Co., Ltd., adherend treated by corona treatment, thickness: 50 μm) and a protective film 4 (PET film; COSMOSHINE® A4300, TOYO BOSEKI Co., Ltd., thickness: 100 μm), and the adhesive composition 2 obtained as described above was dropped in an appropriate amount between the protective film 3 and the polarizer 1, and between the protective film 4 and the polarizer 1 using a dropping pipette, respectively, and bonded by a roll press having rolls 6 and 7.

A polarizing plate 5, bonded in this manner before ultraviolet irradiation, was exposed to UV light at a radiation dose of 1000 mJ/cm² (a metal halide lamp of 365 nm) from the side of protective film 3. Also, bonding of the polarizer and the protective film using the adhesive composition and ultraviolet irradiation were performed at a relative humidity (RH) of 50% at 23° C.

After ultraviolet irradiation, the polarizing plate was maintained at a constant temperature room (23° C., a relative humidity (RH) of 50%) for 24 hours, and the adhesive composition was cured to manufacuture the polarizing plate. The adhesive layer in the prepared polarizing plate had a thickness of 2.0 μm.

As will be described below, an initial curing test was performed on the polarizing plates obtained in Examples and Comparative Examples immediately after ultraviolet irradiation. After ultraviolet irradiation, the polarizing plate was maintained at a room temperature (23° C.) for 24 hours, and a peel strength test, a cutting test, a hot water dipping test and a thermal shock test were performed for evaluation.

<Initial Curing Test>

Figure 2:
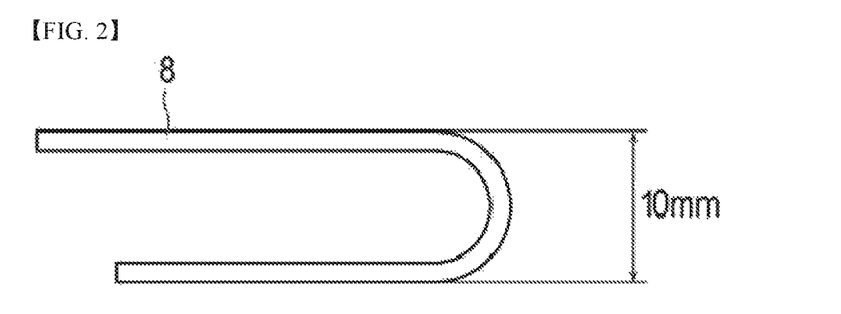
FIG. 2 illustrates a schematic view explaining a method of an initial curing test in Examples.

As illustrated in FIG. 2, the ultraviolet irradiated polarizing plates manufactured in above Examples were immediately bent such that an interval of a bent polarizing plate 8 is 10 mm (R10 mm), and evaluate whether the protective film was detached with naked eyes. When no detachment was observed, it was denoted as "○" and when detachment was observed, it was denoted as "x." Tables 1 to 3 show the evaluation results.

<Peel Strength Test>

The polarizing plates manufactured in above Examples as a specimen for measuring peel strength were cut to a size of 150 mm×25 mm, and a side of the PET film was fixed to a SUS (stainless steel) plate using a double-sided tape. A knife was inserted into the cutting plane of the PET film such that the interface (adhesive layer) between the polarizer of the polarizing plate and the PET film was exfoliated to make an exfoliation portion of the cutting plane. A tensile tester was used to peel the PET film in a peel angle of 90° and a peel rate of 300 mm/min, and a peel strength (peel strength of PET) between the polarizer and the PET film was measured. Table 1 shows the evaluation results. A preferable result is 3 (N/25 mm) or more, and more preferably 5 (N/25 mm) or more.

Likewise, a side of the COP film as a specimen for measuring a peel strength was fixed to a SUS plate using a double-sided tape. A knife was inserted into the cutting plane of the COP film such that the interface (adhesive layer) between the polarizer of the polarizing plate and the COP film was exfoliated to make an exfoliation portion of the cutting plane. A tensile tester was used to peel the COP film in a peel angle of 90° and a peel rate of 300 mm/min, and a peel strength (peel strength COP) between the polarizer and the COP film was measured. Tables 1 to 3 show the evaluation results. A preferable result is 2 (N/25 mm) or more.

<Cutting Test>

The polarizing plates manufactured in above Examples were cuted to a size of 5 cm×5 cm using a Thompson knife, and an exfoliation state of the end side during cutting was observed with naked eyes. As an evaluation criterion, 0.5 mm or less was accepted as a pass criterion. Tables 1 to 3 show the evaluation results. A preferable result is 0.3 mm or less, and more preferably 0.1 mm or less.

<Hot Water Dipping Test>

Figure 3:
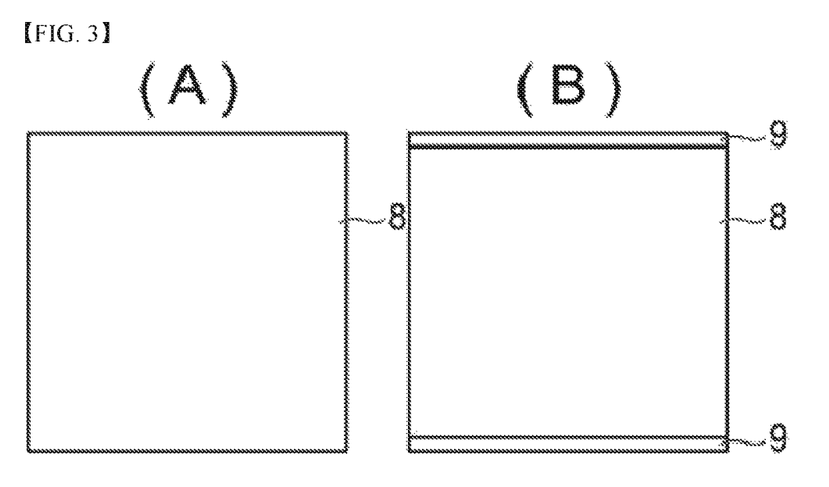
FIG. 3, inclusive of (A) and (B), illustrates a schematic view explaining a method of a hot water dipping test in Examples.

The polarizing plates manufactured in above Examples were cut to a size of 5 cm×5 cm using a Thompson knife as a specimen for measuring a hot water dipping test. The sample was dipped and maintained in a hot water at 60° C. for 2 hours. Then, each sample was taken out from the hot water, and a size of shrinkage of the polarizer was measured. A size of shrinkage 9 was determined by measuring a distance from a cutting plane of the polarizing plate 8 before the test as illustrated in FIG. 3 (A) to a cutting plane of the polarizing plate 8 is shrank in a stretching direction as illustrated in FIG. 3 (B). When the adhesive property of the adhesive is high, shrinkage of the polarizing plate has a small value. When the adhesive property of the adhesive is insufficient, shrinkage has a great value. As an evaluation criterion, a size of shrinkage of less than 2.0 mm was accepted as a pass criterion. Tables 1 to 3 show the evaluation results. A preferable result is 0.5 mm or less, more preferably 0.5 mm or less, and most preferably 0.1 mm or less.

<Thermal Shock Test (Polarizer Crack)>

Figure 4:
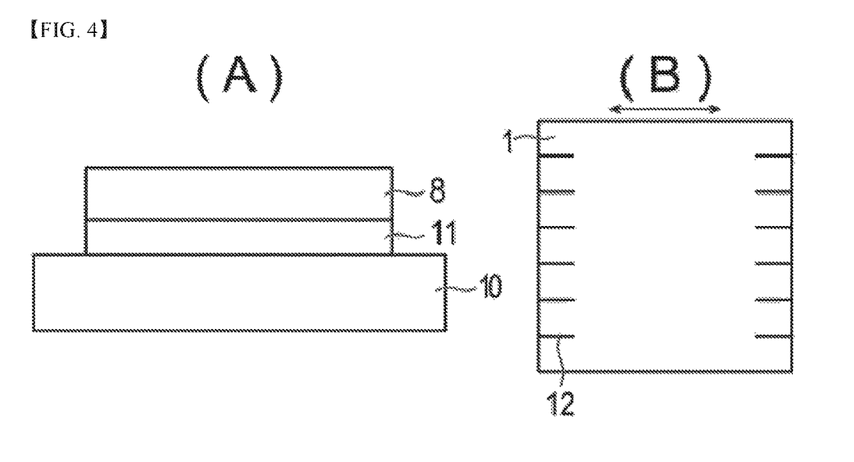
FIG. 4, inclusive of (A) and (B), illustrates a schematic view explaining a method of a peeling test in Examples.

The polarizing plates manufactured in above Examples were cut to a size of 5 cm×5 cm using a Thompson knife as a specimen for measuring a thermal shock test. As illustrated in FIG. 4 (A), the sample was bonded to a glass plate 10 by using a non-support tape 11 (CS-9621T, Nitto Denko Corporation) and maintained at a room temperature (23° C.) for 24 hours before performing the thermal shock test.

The thermal shock test was performed by repeating 100 cycles of placing the specimen at −40° C. for 30 minutes and 85° C. for 30 minutes. After being subjected to thermal shock, the specimen was observed whether the polarizer crack 12 from the cutting plane of the polarizing plate occurred in a stretching direction (arrow direction) of the polarizer 1, as illustrated in FIG. 4 (B). If the polarizer crack 12 was observed, the length of crack was measured. If cracks occurred in multiple points, they were evaluated using an average of each length. When no crack was observed, it was denoted as ⊙. Also, when the size of crack is less than 0.5 mm, it was denoted as ○, and when the size of crack is 0.5 mm or more, it was denoted as x. Tables 1 to 3 show the evaluation results.

TABLE 1

|   |    |        | Examples |    |    |    |    |    |    |
|---|----|--------|----|----|----|----|----|----|----|
|   |    |        | 1  | 2  | 3  | 4  | 5  | 6  | 7  |
| A | A1 | 2021P  | 60 | 60 | 40 | 30 | 60 | 70 | 60 |
|   | A2 | 830CRP | 10 | 10 | 10 | 10 | —  | —  | —  |
|   |    | EX201  | —  | —  | —  | —  | —  | —  | —  |
|   |    | EX141  | —  | —  | —  | —  | 10 | 10 | 10 |
|   | A3 | EX216  | 10 | 10 | 15 | 10 | 10 | —  | 10 |

TABLE 1-continued

|   |   |   | Examples |   |   |   |   |   |   |
|---|---|---|---|---|---|---|---|---|---|
|   |   |   | 1 | 2 | 3 | 4 | 5 | 6 | 7 |
| B | B1 | 4HBA | 10 | 10 | 20 | 25 | 10 | 10 | — |
|   |   | BZA | 10 | 10 | 15 | 25 | 10 | 10 | — |
|   |   | HEAA | — | — | — | — | — | — | — |
|   | B2 | A-TMPT | — | — | — | — | — | — | 20 |
|   |   | 701A | — | — | — | — | — | — | — |
| C |   | CPI 210S | 3 | 3 | 3 | 3 | 3 | 3 | 3 |
| D | Photopolymerization initiator | Ig 907 | 1 | — | 1 | 1 | 1 | 1 | — |
|   | Photosensitizer | DETX-S | — | 1 | — | — | — | — | 1 |
| Initial curability |   |   | ○ | ○ | ○ | ○ | ○ | ○ | ○ |
| Peel strength PET (N/25 mm) |   |   | 8 | 8 | 6 | 5 | 7 | 6 | 4 |
| Peel strength COP (N/25 mm) |   |   | 2.5 | 2.8 | 3 | 3 | 2.8 | 2.8 | 2.2 |
| Cutting test (mm) |   |   | 0.1 | 0.1 | 0.1 | 0.1 | 0.1 | 0.1 | 0.3 |
| Hot water dipping test (mm) |   |   | 0.1 | 0.1 | 0.1 | 0.1 | 0.1 | 0.1 | 0.3 |
| Thermal shock test (mm) |   |   | 2 | 2 | 2.5 | 2.8 | 2.8 | 2.9 | 1 |

TABLE 2

|   |   |   | Examples |   |   |   |   |   |   |
|---|---|---|---|---|---|---|---|---|---|
|   |   |   | 8 | 9 | 10 | 11 | 12 | 13 | 14 |
| A | A1 | 2021P | 60 | 55 | 70 | 70 | 70 | 70 | 70 |
|   | A2 | 830CRP | — | — | — | — | — | — | — |
|   |   | EX201 | — | — | 10 | — | 10 | 10 | 10 |
|   |   | EX141 | 10 | 10 | — | 10 | — | — | — |
|   | A3 | EX216 | 10 | — | — | — | — | — | — |
| B | B1 | 4HBA | — | — | — | — | — | — | — |
|   |   | BZA | — | — | — | — | 5 | 5 | — |
|   |   | HEAA | — | — | — | — | — | — | 10 |
|   | B2 | A-TMPT | — | 35 | 20 | — | 15 | — | 10 |
|   |   | 701A | 20 | — | — | 20 | — | 15 | — |
| C |   | CPI 210S | 3 | 3 | 3 | 3 | 3 | 3 | 3 |
| D | Photopolymerization initiator | Ig 907 | — | 1 | 1 | 1 | 1 | 1 | 1 |
|   | Photosensitizer | DETX-S | 1 | — | — | — | — | — | — |
| Initial curability |   |   | ○ | ○ | ○ | ○ | ○ | ○ | ○ |
| Peel strength PET (N/25 mm) |   |   | 4.2 | 3.8 | 4.5 | 4.8 | 5.0 | 5.0 | 4.8 |
| Peel strength COP (N/25 mm) |   |   | 2.5 | 2.1 | 2.3 | 2.5 | 2.3 | 2.3 | 2.5 |
| Cutting test (mm) |   |   | 0.3 | 0.3 | 0.3 | 0.3 | 0.3 | 0.3 | 0.3 |
| Hot water dipping test (mm) |   |   | 0.3 | 0.3 | 0.3 | 0.3 | 0.3 | 0.3 | 0.3 |
| Thermal shock test (mm) |   |   | 1.5 | 1.5 | 1 | 1.5 | 1.3 | 1.5 | 1.8 |

TABLE 3

|   |   |   | Comparative Examples |   |   |   |   |   |   |
|---|---|---|---|---|---|---|---|---|---|
|   |   |   | 1 | 2 | 3 | 4 | 5 | 6 | 7 |
| A | A1 | 2021P | 20 | 15 | 25 | 30 | — | 4 | 15 |
|   | A2 | 830CRP | 10 | — | — | 20 | 20 | 16 | — |
|   |   | EX201 | — | — | — | — | — | — | — |
|   |   | EX141 | — | — | — | 30 | 20 | 26 | — |
|   | A3 | EX216 | 10 | — | 75 | — | 40 | 34 | — |
| B | B1 | 4HBA | 30 | 85 | — | 10 | 10 | 10 | — |
|   |   | BZA | 30 | — | — | 10 | 10 | 10 | — |
|   |   | HEAA | — | — | — | — | — | — | — |
|   | B2 | A-TMPT | — | — | — | — | — | — | 85 |
|   |   | 701A | — | — | — | — | — | — | — |
| C |   | CPI 210S | 3 | 3 | 3 | 3 | 3 | 3 | 3 |
| D | Photopolymerization initiator | Ig 907 | 1 | 1 | — | 1 | 1 | 1 | 1 |
|   | Photosensitizer | DETX-S | — | — | — | — | — | — | — |
| Initial curability |   |   | ○ | □ | □ | □ | □ | □ | ○ |
| Peel strength PET (N/25 mm) |   |   | 2.0 | 0.5 | 0.8 | 1.2 | 1.2 | 1.2 | 0.5 |
| Peel strength COP (N/25 mm) |   |   | 1.5 | 0.2 | 0.8 | 1.0 | 0.8 | 1.0 | 0.3 |

TABLE 3-continued

|  | Comparative Examples | | | | | | |
| --- | --- | --- | --- | --- | --- | --- | --- |
|  | 1 | 2 | 3 | 4 | 5 | 6 | 7 |
| Cutting test (mm) | 1.0 | 3.0 | 2.5 | 2.0 | 1.0 | 1.0 | 2.0 |
| Hot water dipping test (mm) | 1.5 | seperated | 3 | 10 | 5 | 5 | 2.0 |
| Thermal shock test (mm) | 10 | 50 | 40 | 30 | 30 | 40 | 5.0 |

(A) Epoxy Group-Containing Compound
A1: Alicyclic epoxy group-containing compound
2021P: CELLOXIDE 2021P (Daicel Corp.)
A2: Aromatic group- and epoxy group-containing compound
830CRP: EPICLON EXA-830CRP (DIC Co., Ltd.)
EX201: DENACOL EX-201 (Nagase ChemteX Corp.)
EX141: DENACOL EX-141 (Nagase ChemteX Corp.)
A3: Alicyclic group- and epoxy group-containing compound
EX216: DENACOL EX-216 (Nagase ChemteX Corp.)
(B) (Meth)Acrylate Monomer
B1: Monofunctional (meth)acrylate monomer
4HBA: 4-Hydroxybutylacrylate
BZA: Benzyl acrylate
HEAA: Hydroxyethyl acrylamide (KOHJIN Film & Chemicals Co., Ltd.)
B2: Polyfunctional (meth)acrylate monomer
A-TMPT: Trimethylolpropane triacrylate (Shinnakamura Kagaku Kogyo Co., Ltd.)
701A: 2-Hydroxy-3-acryloyloxypropyl methacrylate (Shinnakamura Kagaku Kogyo Co., Ltd.)
(C) Photoacid Generator
CPI 210S: CPI-210S (SAN-APRO Co., Ltd.)
(D) Photosensitizer and/or the Photopolymerization Initiator
Ig 907: Irgacure 907 (BASF JAPAN Co., Ltd.)
DETX-S: DETX-S(Nippon Kayaku Co., Ltd.)

As shown in Tables 1 to 4, Examples 1 to 14 showed good results in the initial curing test, the peel strength test, the cutting test, the hot water dipping test and the thermal shock test. However, Comparative Examples 1 to 7 did not satisfy the evaluation criterion in the cutting test and the hot water dipping test, and also showed lower result values than those of Examples in the peel strength test and the thermal shock test. In addition, Comparative Examples 2 to 6 had insufficient initial curability.

Examples 1 to 5, 7 and 8 showed the relatively higher values in the peel strength test compared with those of other Examples. It is considered that a reduction in adhesion due to the volume contraction was prevented since the adhesive composition had reduced curing distortion, by comprising the (A3) alicyclic group- and epoxy group-containing compound.

Examples 7 to 14 showed the relatively better values in the thermal shock test than those of other Examples. It is considered that cracks in the polarizer by thermal shock was more effectively prevented, since the (A) component and the (B2) component formed a complicatedly tangled network structure after cross-linking, resulting in the adhesive layer having high modulus of elasticity, by comprising the (B2) polyfunctional (meth)acrylate monomer.

As described above, from the comparison of the results of Examples and Comparative Examples, it can be seen that the adhesive composition of the present invention exhibited good initial curability, adhesion and reliability in using it to the polarizing plate.

DESCRIPTION OF REFERENCE NUMERALS

1: Polarizer
2: Adhesive composition solution
3: Protective film (COP Film)
4: Protective film (PET film)
5: Polarizing plate prior to irritation of ultraviolet
6, 7: Roll
8: Polarizing plate
9: Size of shrinkage
10: Glass plate
11: Non-support tape
12: Polarizer crack

The invention claimed is:
1. An adhesive composition for polarizing plates, comprising:
100 parts by weight of a polymerizable component including about 50 parts by weight to about 90 parts by weight of an epoxy group-containing compound (A) and about 10 parts by weight to about 50 parts by weight of a (meth)acrylate monomer (B), based on 100 parts by weight of the polymerizable component;
about 1 part by weight to about 7 parts by weight of a photoacid generator (C); and
about 0.1 parts by weight to about 7 parts by weight of at least one of a photosensitizer and a photopolymerization initiator (D);
wherein, the epoxy group-containing compound (A) comprises about 50 parts by weight to about 95 parts by weight of an alicyclic epoxy group-containing compound (A1) and about 1 part by weight to about 50 parts by weight of an aromatic group- and epoxy group-containing compound (A2), based on 100 parts by weight of the epoxy group-containing compound (A), and
the alicyclic epoxy group-containing compound (A1) and the aromatic group- and epoxy group-containing compound (A2) have a weight ratio of about 3:1 to about 95:1,
wherein when peeled under conditions of a peeling angle of 90° and a peeling rate of 300 mm/min, a polarizer and a PET film bonded by a cured product of the adhesive composition has a peel strength of 3 N/25 mm or more, or the polarizer and a COP film bonded by the cured product of the adhesive composition has a peel strength of 2 N/25 mm or more.

2. The adhesive composition for polarizing plates according to claim 1, wherein the epoxy group-containing compound (A) further includes more than about 0 part by weight and about 40 parts by weight or less of an alicyclic group- and epoxy group-containing and aromatic group-free compound (A3), based on 100 parts by weight of the epoxy group-containing compound (A).

3. The adhesive composition for polarizing plates according to claim 2, wherein the epoxy group-containing compound (A) comprises:

about 50 parts by weight to about 80 parts by weight of the alicyclic epoxy group-containing compound (A1);
about 1 part by weight to about 27 parts by weight of the aromatic group- and epoxy group-containing compound (A2); and
about 1 part by weight to about 40 parts by weight of the alicyclic group- and epoxy group-containing and aromatic group-free compound (A3), based on 100 parts by weight of the epoxy group-containing compound (A).

4. The adhesive composition for polarizing plates according to claim 1, wherein the (meth)acrylate monomer (B) includes more than about 0 part by weight and about 100 parts by weight or less of a polyfunctional (meth)acrylate monomer (B2), based on 100 parts by weight of the (meth) acrylate monomer (B).

5. A polarizing plate comprising a polarizer and a protective film, wherein the polarizer and the protective film are bonded using the adhesive composition for polarizing plates according to claim 1.

6. The polarizing plate according to claim 5, wherein the protective film is a PET film, and the polarizer and PET film have a peel strength of about 3 N/25 mm or more under conditions of a peel angle of 90° and a peel rate of 300 mm/min.

7. The polarizing plate according to claim 5, wherein the protective film is a COP film, and the polarizer and COP film have a peel strength of about 2 N/25mm or more under conditions of a peel angle of 90° and a peel rate of 300 mm/min.

8. An image display device having the polarizing plate according to claim 5.

9. The adhesive composition for polarizing plates according to claim 1, wherein the alicyclic epoxy group-containing compound (A1) and the aromatic group- and epoxy group-containing compound (A2) have a weight ratio of 4:1 to about 95:1.

10. An adhesive composition for polarizing plates, comprising:
a polymerizable component including about 50 parts by weight to about 90 parts by weight of an epoxy group-containing compound (A) and about 10 parts by weight to about 50 parts by weight of a (meth)acrylate monomer (B), based on 100 parts by weight of the polymerizable component;
about 1 part by weight to about 7 parts by weight of a photoacid generator (C); and
about 0.1 parts by weight to about 7 parts by weight of at least one of a photosensitizer and a photopolymerization initiator (D);
wherein, the epoxy group-containing compound (A) includes about 60 parts by weight to about 95 parts by weight of an alicyclic epoxy group-containing compound (A1) and about 5 parts by weight to about 40 parts by weight of an aromatic group- and epoxy group-containing compound (A2), based on a total of 100 parts by weight of the epoxy group-containing compound (A),
the (meth)acrylate monomer (B) includes more than about 0 part by weight and about 100 parts by weight or less of a polyfunctional (meth)acrylate monomer (B2), based on a total of 100 parts by weight of the (meth) acrylate monomer (B), and
wherein when peeled under conditions of a peeling angle of 90° and a peeling rate of 300 mm/min, a polarizer and a PET film bonded by a cured product of the adhesive composition has a peel strength of 3 N/25 mm or more, or the polarizer and a COP film bonded by the cured product of the adhesive composition has a peel strength of 2 N/25 mm or more.

11. The adhesive composition for polarizing plates according to claim 10, wherein the epoxy group-containing compound (A) further includes more than about 0 part by weight and about 40 parts by weight or less of an alicyclic group- and epoxy group-containing and aromatic group-free compound (A3), based on a total of 100 parts by weight of the epoxy group-containing compound (A).

12. The adhesive composition for polarizing plates according to claim 10, wherein the alicyclic epoxy group-containing compound (A1) and the aromatic group- and epoxy group-containing compound (A2) have a weight ratio of about 3:1 to about 19:1.

* * * * *